United States Patent
Noel et al.

(10) Patent No.: US 6,412,831 B1
(45) Date of Patent: Jul. 2, 2002

(54) THREADED CONNECTION OF TWO METAL TUBES WITH HIGH TIGHTENING TORQUE

(75) Inventors: Thierry Noel, Sebourg; Emmanuel Varenne, Valenciennes, both of (FR)

(73) Assignee: Vallourec Mannesmann Oil & Gas France, Aulnoye-Aymerics (FR)

( * ) Notice: Subject to any disclaimer, the term of this patent is extended or adjusted under 35 U.S.C. 154(b) by 0 days.

(21) Appl. No.: 09/530,594

(22) PCT Filed: Sep. 2, 1999

(86) PCT No.: PCT/FR99/02084

§ 371 (c)(1), (2), (4) Date: Jul. 11, 2000

(87) PCT Pub. No.: WO00/14441

PCT Pub. Date: Mar. 16, 2000

(30) Foreign Application Priority Data

Sep. 7, 1998 (FR) .............................................. 98 11278
Jan. 6, 1999 (FR) .............................................. 99 00161

(51) Int. Cl.$^7$ ................................................ F16L 25/00
(52) U.S. Cl. ..................... 285/334; 285/355; 285/333; 285/390
(58) Field of Search ................................. 285/333, 334, 285/355, 390

(56) References Cited

U.S. PATENT DOCUMENTS

| | | | | |
|---|---|---|---|---|
| 4,629,224 A | * | 12/1986 | Landriault | 285/334 |
| 5,681,059 A | * | 10/1997 | Mackie | 285/334 |
| 5,829,797 A | * | 11/1998 | Yamamoto et al. | 285/333 |
| 6,158,785 A | * | 12/2000 | Beaulier et al. | 285/334 |

* cited by examiner

Primary Examiner—Lynne H. Browne
Assistant Examiner—Aaron Dunwoody
(74) Attorney, Agent, or Firm—Oblon, Spivak, McClelland, Maier & Neustadt, P.C.

(57) ABSTRACT

A threaded connection for two metal pipes which includes a tapered male thread with trapezoidal threads on a male element and a mating female thread on a female element. The thread width of the male and female threads, at the thread crest, is less than the thread width at the thread root. The width of the thread crests is larger than the width of a space between the roots of the mating threads. The male and female elements are screwed to a position located beyond that of the position where two flanks of the male threads come into contact with two flanks of the female threads. Such a connection permits makeup with a very high torque. The threads of one and/or the other of the threads can optionally include a groove opening into the thread crest.

15 Claims, 7 Drawing Sheets

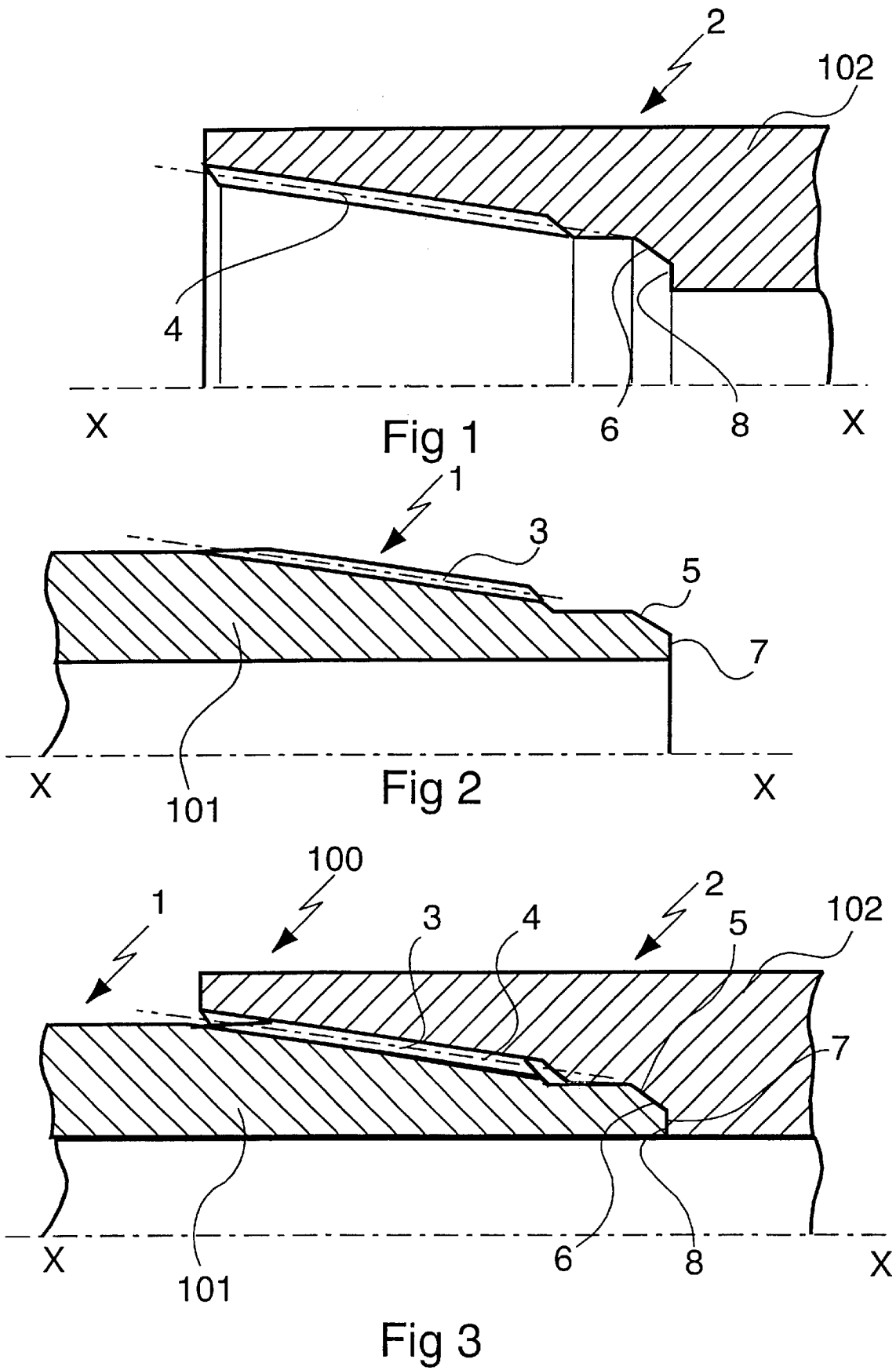

THREADED CONNECTION OF TWO METAL TUBES WITH HIGH TIGHTENING TORQUE

BACKGROUND OF THE INVENTION

1. Field of the Invention

The invention relates to threaded connections for two metal pipes with a tapered thread and with trapezoidal threads.

Such connections are known, in particular for strings of casing pipes or production tubing or drillpipe strings for hydrocarbon wells.

2. Discussion of the Background

In the remainder of the present document, the term "threaded connection for two metal pipes" will encompass both an integral connection between two long pipes and a connection between a first, long, pipe and a second, short, pipe such as a coupling.

The American Petroleum Institute (API) defines:
in specification API 5CT, metal pipes and threaded metal pipe connections for production and for casing hydrocarbon wells;
and in specification API 5B, standard tapered thread forms for such connections.

The threads of such API thread connections can be trapezoidal and then comprise, on each of the male and female elements, a thread root, a thread crest and two flanks, namely a load flank and a stabbing flank.

The thread roots and thread crests are normally parallel to the taper of the thread.

The load flanks are so termed because on bearing against each other when the connection is subjected to tensile forces, for example due to the weight of the pipes, they enable the connection to tolerate such tensile forces. The load flanks are located on the threads opposite the stabbing flanks.

When making up such an API connection, depending on the taper of the threads, at a given moment corresponding to a given relative position of the male and female elements, the thread roots of one of the elements come into contact with the thread crests of the other element.

If screwing of the male element is continued into the female element beyond that position, the male threads start to interfere radially with the female elements, which leads to an expansion of the female element and a contraction in the male element; such an interference must be limited so as not to develop excessive stresses or deformation.

The diametrical interference between the mated points of two surfaces of revolution which radially interfere is generally defined as the difference in the diameter of the half cross section of the surfaces at those points, the difference being measured before connection and taken to be positive when the two surfaces, once connected, exert a contact pressure between the mated points.

To limit such stresses or deformations, an annular bearing surface which is orientated substantially transverse with respect to the axis of the connection can be provided on each of the male and female elements, the bearing surfaces being positioned such that they come into abutment with each other at a given moment during makeup thus precisely defining a makeup completion position.

The position at the end of connection makeup is, for example, determined by the torque required to arrive at that position.

The use of abutting bearing surfaces to position the connection has other advantages:
placing the load flanks of the connection threads under tension which are then ready to tolerate the tensile stresses to which the connection is subjected during service;
precise positioning of the male and female elements thus guaranteeing, when each of the male and female elements of the connection comprises a sealing surface which radially interferes with that located on the mating element, a high metal-metal contact pressure between the surfaces with no risk of plastification thereof;
reduced risk of accidental breakout because of the makeup torque which has to be overcome before being able to break out the connection, this torque being well defined and always above a minimum value.

European patent EP-A-0 488 912 describes such a connection with tapered threads screwed one into the other, a pair of radially interfering metal-metal sealing surfaces and a pair of abutting bearing surfaces, namely a concave tapered surface at the end of the male element and a convex annular surface forming an internal shoulder on the female element.

Such a threaded connection can be made up with high nominal makeup torques which can be up to 34 kN.m (25000 lbf.ft), for example, which is sufficient in the majority of cases.

However, it may be necessary to make up the connection with even higher torques, in particular for casing pipes for multiple deviated wells or horizontal wells enabling a wide zone to be exploited from a single site.

The use of techniques for rotating the string comprising drillpipes at their end (drilling liner) also permits better cementing of horizontal wells but necessitates pipe connections made up with torques which are higher than the rotational torque of the string if it is desired to prevent the threaded elements from rotating with respect to each other when the string is rotated, which rotation between elements can modify the characteristics of use of the connections, in particular their sealing properties.

Table 1 below gives an idea of the desired makeup torques for such applications.

TABLE 1

| Desired level of makeup torque | | | |
|---|---|---|---|
| External pipe diameter | | Level of makeup torque | |
| (mm) | (") | (kN · m) | (lbf · ft) |
| 101.6–139.7 | 4"–5"½ | 20–34 | 15000–25000 |
| 168.3–177.8 | 6"⅝–7" | 27–41 | 20000–30000 |
| 244.5 | 9"⅝ | 54–88 | 40000–65000 |

The abutting bearing surfaces can only tolerate such torques without deterioration if the radial width of the abutment surfaces is increased, but then much thicker pipes have to be used which may be incompatible with service requirements.

Thus other means have to be used than abutting bearing surfaces to absorb high makeup torques.

International patent application WO 94/29627 describes a threaded connection with a tapered thread and trapezoidal threads known as wedge threads in the general form of a dovetail and more particularly a half dovetail.

Such threads are known as wedge threads or threads with a variable width since the width of the male and female threads varies from one end of the thread to the other in a manner which is coordinated between the male and female threads.

Such threads are termed "half dovetail" since they overhang the thread roots on one side only, either on the load flank side, or on the stabbing flank side, and because the angle between the load flank and the normal to the connection axis and that between the stabbing flank and said normal is such that the thread width is higher at the crest than at the root.

When the male element is engaged in the female element in accordance with WO 94/29627, the narrowest thread crests face the widest thread roots and there is a large axial clearance between the mating flanks of the threads.

As the male element is screwed into the female element, the axial clearance reduces to a position where the two male flanks come into contact with their female mates.

Beyond that position, the female flanks interfere with the male flanks and there ensues a very rapid increase in the curve of the makeup torque as a function of rotation.

Such a connection in accordance with WO 94/25627 can certainly tolerate a high makeup torque due to the developed surface of the threads but it suffers from a number of important disadvantages.

Firstly, variable width wedge threads are expensive to machine and difficult to inspect.

Further, the acute angles of dovetails or half dovetails disposed on the load flank side and/or on the stabbing flank side, constitute sharp angles which are sensitive to cuts and flash from such cuts are deleterious to the function of the connection.

Such sharp angles also notch the thread roots and as a result the threads are more fragile during use.

SUMMARY OF THE INVENTION

The present invention seeks to provide a threaded connection which can be made up to a high makeup torque T which is free of such disadvantages and in particular a threaded connection which is economical to machine and which can be readily manipulated on-site.

We have also sought to provide a threaded connection whereby the desired makeup torque is obtained after considerable rotation, for example of the order of one turn, or more.

We have also ensured that in certain configurations, the slope of the makeup torque—rotation curve is reduced from a given torque, resulting in a self-limiting characteristic for the makeup torque.

We have also sought to provide a connection which is particularly tight to internal and/or external fluids, even after a number of makeup-breakout operations.

The threaded connection between two metal pipes of the present invention comprises a male element at the end of a first pipe screwed into a female element at the end of a second pipe.

The male element has an external tapered male thread with trapezoidal threads where the thread width at the thread crests is less than the thread width at the thread root.

The female element comprises an internal tapered female thread with trapezoidal threads with a form which mates with that of the male thread.

The term "female thread mating with that of the thread" here means that the taper and pitch of the female thread are substantially identical to those of the male thread and that the thread form of the female threads is substantially identical to that of the male threads, the inclination of the load flanks and stabbing flanks of the female threads to the connection axis being in particular identical to that of the corresponding flanks on the male elements, the width of the female thread crests being less than that of their root as with the male threads. Clearly, the form of the male thread then reciprocally mates with that of the female thread.

The width of the thread crests on each of the male and female threads is higher than the width of the space between the roots of the mating threads.

The male element is positioned by screwing into the female element to a relative position of these two elements located beyond that where, during makeup, the two male thread flanks come into contact with the two female thread flanks, so as to induce an axial interference fit of the male threads by the female threads, and vice versa.

Depending on the mating form of the male and female trapezoidal threads used and because the thread width at the crest is lower than the thread width at the root, the male and female threads penetrate radially and wedge into the mating hollows by a wedging effect as the axial progression of the threads occurs during makeup and thus, beyond the position of contact of the two mating flanks, induce an axial interference fit of the male threads by the female threads and vice versa.

This interference fit over all of the surface of the flanks results in the possibility of absorbing a high degree of makeup torque T in the threads.

The features of such threads are such that they can be made cheaply, they are easy to inspect and are not fragile in use.

EP-A-0 454 147 describes a threaded connection with a tapered thread and trapezoidal threads where the width of the female thread crests is higher than that of the male thread roots and in which when connection makeup is complete the two flanks of the thread of one element are in contact with those of the mating element, at least over a portion of the thread.

However, in EP-A-0 454 147, only simple contact has been aimed at, even only partial contact, between the mating flanks so that, when the connection is to be subjected to compression stresses after having been subjected to tensile stresses, there is no re-positioning of the stabbing flanks due to an axial clearance which pre-exists with the latter, which re-positioning can cause plastification of the metal, in particular the sealing surfaces, and can thus cause a subsequent risk of leakage when the connection is again subjected to tensile stresses. To obtain such a simple contact of the thread flanks when connection makeup is complete, EP-A-454 147 has to use means for positioning the elements, namely a transverse bearing surface on each element, each bearing surface being able to abut against that of the mating element. The mating male and female stabbing flanks are disposed so as to provide a minimum axial clearance between them before the bearing surfaces come into contact, which axial clearance reduces to zero or almost zero when the bearing surfaces come into abutment. These transverse abutting surfaces can also, conventionally, absorb the makeup torque, but EP-A-0 454 147 does not disclose a high makeup torque threaded connection.

In the present invention, when connection makeup is complete, the diametrical interference between the thread crests of each of the two male and female threads and the mating thread roots is preferably negative or zero.

Very preferably, when the two flanks of the male thread come into contact with their mating female threads during makeup, a radial clearance of at least 0.15 mm subsists between the crests and roots of the mated threads.

In a preferred variation, the diametrical interference between the thread crests of one only of the two male or female threads and the thread roots of the mated thread is positive when makeup is complete.

Preferably, to obtain an effective axial interference fit of the threads by a wedge effect, the angle $\delta$ between the load flank and the stabbing flank of the male or female threads is less than or equal to 20°.

Highly preferably, it is in the range 7° to 20° and more particularly, close to 10°.

Preferably again, the thread crests of each of the male and female threads overhang the thread roots of the same thread on the load flank side, the angle α between the load flank and the normal to the connection axis thus being negative and having a value in the range 0 to −15°.

Advantageously, if too severe a wedge effect causing too high a slope dT/dN of the curve of the makeup torque as a function of the number of turns is to be attenuated, at least one of the male and/or female threads comprises a groove opening into the thread crest over all or a portion of the length of the thread or threads.

Such a groove increases the flexibility of the thread and somewhat reduces the axial interference fit forces and reduces the more these forces as the groove has a substantial depth and width. This results in a substantial reduction in the slope dT/dN of the curve of the makeup torque as a function of the number of turns at the expense of a slight reduction in the maximum makeup torque. Thus the combination of the two characteristics, maximum makeup torque and slope dT/dN, can be optimised.

French patent FR-A-2 408 061 describes threaded connections with trapezoidal threads in which one of the threads carries a type of groove opening into the thread crest.

However, that groove is closely associated with structures of the thread flanks producing a self-locking connection, i.e., resisting breakout: to this end, the inclination of the thread flanks with the groove is different from that of the thread flanks with no groove and is such that the width of the groove at its opening reduces during makeup under the bending forces resulting from the differences in orientation of the mating thread flanks.

This document does not disclose the function of the means of the connection of the invention and is not applicable to threads with the characteristics of the invention, in particular a female thread form which mates with the male threads.

Preferably, in accordance with the invention, the groove depth is at most equal to the thread depth and the groove width at its opening into the thread crest is at most ⅔ of the thread width, the thread depth being the radial distance measured perpendicular to the connection axis between the taper enveloping the thread crests and that of the thread roots and the thread width being measured parallel to the connection axis at the thread mid-depth.

Preferably again, the groove has, in a longitudinal axial plane, a U profile with arms which may or may not be parallel, or in the shape of a V with a rounded base.

Very preferably, the rounded base of the groove has a radius of at least 0.2 mm to prevent stress concentration in the groove base.

Preferably again, each of the male and female elements comprises at least one sealing surface, the orientation of each male sealing surface being substantially longitudinal and radially interfering with a mating female sealing surface at the end of the connection makeup so as to seal the connection.

Preferably again, each of the male and female elements comprises at least one substantially transverse bearing surface, at least one abutting male bearing surface coming into abutment against a female bearing surface at the end of the connection makeup to precisely position the sealing surfaces and thus define their interference.

Such bearing surfaces do not, however, act to define the position at the end of connection makeup when the stabbing flanks of the threads come into contact.

BRIEF DESCRIPTION OF THE DRAWINGS

The following figures illustrate particular non limiting embodiments of the invention.

FIG. 1 shows an axial half cross section of one end of a pipe or coupling comprising a female element of a threaded connection of the invention.

FIG. 2 shows an axial half cross section of one end of a further pipe comprising a male element of a threaded connection of the invention.

FIG. 3 shows an axial half cross section of a threaded connection obtained after makeup of the elements of FIGS. 1 and 2.

DESCRIPTION OF THE PREFERRED EMBODIMENTS

Figure 4:
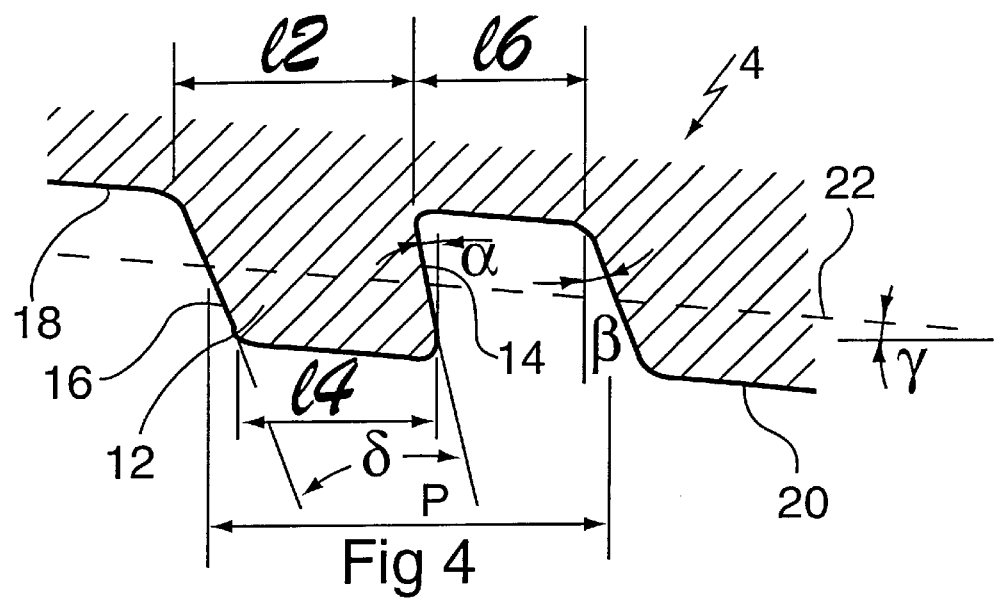
FIG. 4 is a schematic half cross section of a detail of a few female threads of the female element of FIG. 1.

FIG. 3 shows a threaded connection 100 between a male element 1 at one end of a first metal pipe 101 and a female element 2 at one end of a second metal pipe 102 which may be a long pipe or a coupling. Such threaded connections can, for example, constitute strings of casing pipe or production tubing for hydrocarbon wells.

Male element 1 shown in FIG. 2 comprises on its external surface a tapered male thread 3 with trapezoidal threads and its end, which is also the end of the first pipe, has an annular transverse male end surface 7.

Female element 2 shown in FIG. 1 has on its inter surface a tapered female thread 4 which mates with male thread 3.

Pipes 101 and 102 are connected by screwing male thread 3 on male element 1 into female thread 4 on female element 2.

The connection of FIG. 3 optionally comprises, on each of the elements, additional means when the connection needs to be particularly tight, namely:

a) on the male element, an external tapered male sealing surface 5 the taper of which is generally higher that that of the male thread 3; the taper of the male sealing surface 5 measured on the diameter is 20%, for example;

b) on the female element:

an internal tapered female sealing surface 6 the taper of which is substantially identical to that of the male sealing surface 5;

an internal shoulder with an annular and transverse bearing surface 8.

The male end surface 7 can, in known manner, be concave tapered with a very open vertex half angle, for example 75°, the female bearing surface 8 in this case being convex with the same vertex half angle.

The additional means 5, 6, 8, which are optional as regards the invention, function as follows on the connection 100.

The male sealing surface 5 interferes radially with the female sealing surface 6, i.e., its diameter at a reference point before connection is higher than the diameter of the mating point on the female sealing surface 6, this diameter also being measured before connection.

During makeup, once the sealing surfaces have made contact, continuing makeup induces an increasing diametrical interference in the sealing surfaces.

The precise position on makeup completion is determined by abutment of the male end surface 7 against bearing surface 8 of the internal female shoulder, which defines a precise value for the interference between the sealing surfaces 5, 6.

The position when connection is complete can be marked by a given value of the makeup torque.

The concave-convex form of bearing surfaces 7, 8 prevents the bearing surfaces from coming apart and increases the contact pressure between the sealing surfaces.

Figure 5:
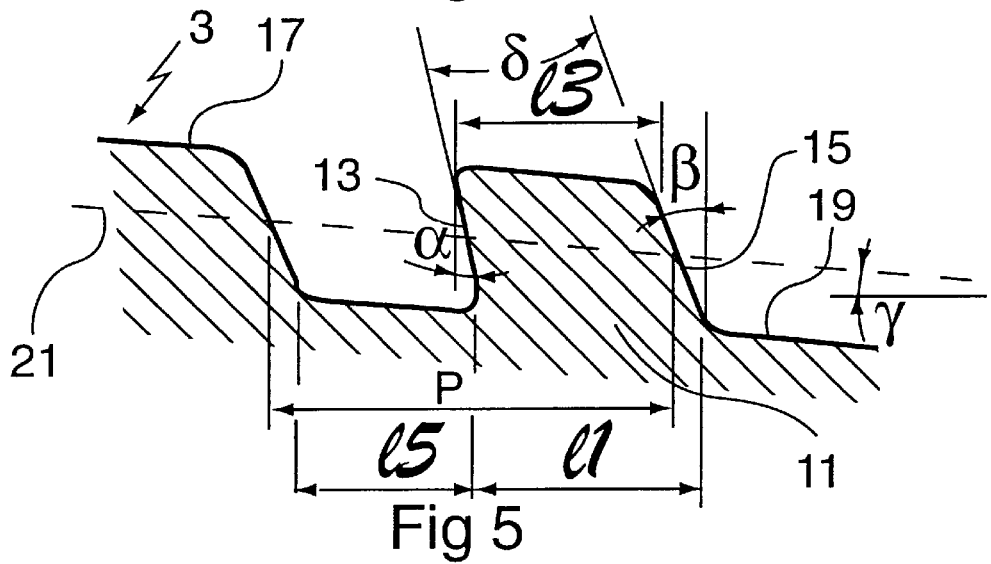
FIG. 5 is a schematic half cross section of a detail of a few male threads of the male element of FIG. 2.
Figure 6:
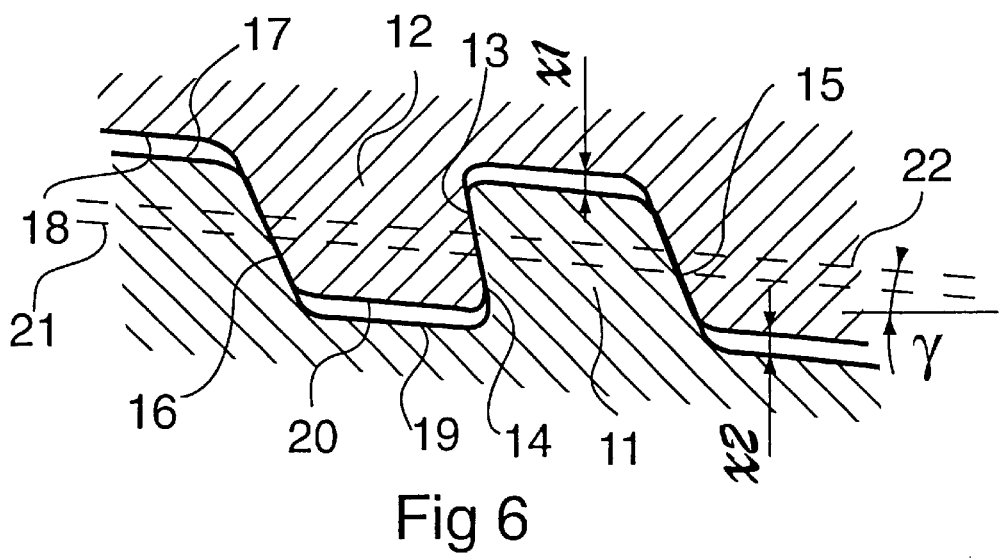
FIG. 6 is an axial half cross section of a detail of a few threads FIGS. 4 and 5 during makeup, the connection being of the type shown in FIG. 3.

FIGS. 4, 5 and 6 show features of the male and female threads of a connection of the invention.

Male thread 3 (FIG. 5) is a tapered thread with a pitch P the pitch surface directrix line 21 (abbreviated to pitch line) of which is inclined at an angle $\gamma$ to the connection axis such that $\gamma = \arctan(TT/200)$, TT being the taper of the thread with respect to the diameter and expressed as a %.

The male threads 11 are trapezoidal threads with a thread crest 17, two flanks 13 and 15 and are separated by a thread root 19.

The thread crests 17 and thread roots 19 are parallel to the male pitch line 21.

The flanks comprise a load flank 13 and a stabbing flank 15, the latter being turned towards the male end surface 7.

The load flanks 13 and stabbing flanks 15 are respectively inclined at an angle $\alpha$ and $\beta$ with respect to the normal to the axis of the connection with an angle $\delta$ between them.

The thread crests 17 overhang the thread roots 19 on the side of the load flanks 13 in FIG. 5 so as to prevent the threads from jumping out during makeup. By convention, the angle $\alpha$ is negative, the angle $\beta$ on the non overhanging side being positive.

The angle is also the algebraic sum of $(\alpha+\beta)$ and its apex is directed towards the exterior of the male thread such that the male threads 11 have a width l1 at the root which is higher than that l3 at their crest.

The female thread 4 (FIG. 4) has matching characteristics to those of male thread 3.

The female pitch line 22 of the female thread is inclined at an angle $\gamma$ to the connection axis X, which angle is identical to the inclination of the male pitch line 21.

The crests 20 and roots 18 of the female thread are parallel to the female pitch line 22.

The load flanks 14 and stabbing flanks 16 of the female thread are respectively inclined at an angle $\alpha$ and $\beta$ to the normal to the connection axis X and form an angle $\delta$ between them, each of these angles being identical to the corresponding male angle.

The width l3 of the male thread crest 17 is slightly larger than the width l6 of the female thread root 18, for example by 0.2 mm.

The width l4 of the female thread crest 20 is slightly larger than the width l5 of the male thread root 19, for example by 0.2 mm.

When the male thread 3 is screwed into the female thread 4, at a given moment illustrated in FIG. 6, the two flanks 13, 15 of male threads 11 come into contact with the two flanks 14, 16 of female threads 12 over substantially the entire depth of these flanks.

This results from the fact that the width of the male and female crests 3, 4 is larger than the width of the space l6, l5 between the roots of the mating threads, and from the trapezoidal form of the threads, with l1>l3 and l2>l4.

If makeup is continued, male threads 11 penetrate radially and wedge into the female hollows and similarly, female threads 12 bury radially and wedge into the male hollows.

For this reason, there exists an axial interference fit of the male thread flanks and female thread flanks and it is necessary to considerably increase the torque to continue makeup. This results in a very steep slope dT/dN of the curve of the makeup torque as a function of the number of turns N, depending on the surface area of the interference fit flanks which are in contact over substantially the entire depth and over their length.

The slope dT/dN is a function of the modulus of elasticity of the metal of the elements, of the taper TT of the thread, of the length of the thread, the mean diameter thereof, the thread depth, the angle $\delta$ between the flanks of a thread and of the coefficient of friction between the male and female threads. It is thus possible to predict the slope dT/dN.

In order for the male and female threads to be able to penetrate radially into the mating hollows, angle $\delta$ of the wedge formed by thread flanks 11, 12 is advantageously not too large and remains, for example, below 20°.

An angle $\delta$ which is too low is also not desirable as the wedge phenomenon will be more difficult to implement: preferably, angle $\delta$ is in the range [7°, 20°], with an angle $\delta$ of 10° being preferred.

The choice of threads with load flanks 13, 14 having a negative angle $\alpha$, for example $\alpha = -3°$ can also enable an angle $\beta$ of +13° to be used which is sufficiently inclined to enable the threads to engage easily.

The maximum admissible value of the makeup torque T is determined by the elastic limit of the metal of the elements. It is thus possible to predict the maximum admissible value for the makeup torque.

In order to obtain an optimum wedge effect without excessive stresses in the male and female elements and to allow the grease disposed on the threads before connection to flow, any radial interference between the thread crests (17, 20) of each of the two male and female threads (3, 4) and the thread roots (18, 19) of the mated thread (4, 3) should be avoided; thus threads can be designed, in particular in their width, in which the diametrical interference between the thread crests of each of two male and female threads and the thread roots of the mated thread is negative or zero when makeup is complete.

In particular, threads can be designed for which at the moment of first contact on the two flanks (FIG. 6), the value x1 of the radial clearance between the male thread crest 17 and the female thread hollow 18 and that x2 of the radial clearance between the female thread crest 20 and the male thread hollow 19 is at least 0.15 mm.

Instead of avoiding any radial interference between the thread crests of each of the two male and female threads (3, 4) and the thread roots of the mated thread (4, 3), in a variation, threads 71, 72, in particular their width and depth, can be designed to create a positive diametrical interference between the thread crests of one of the male or female threads and the thread roots of the mating thread when makeup is complete.

Figure 7:
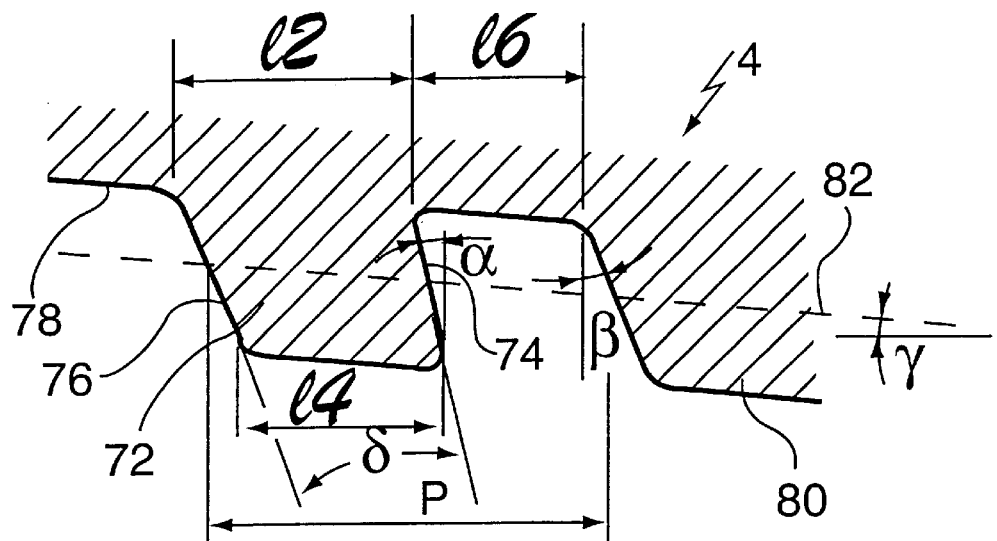
FIGS. 7 and 8 show a variation of FIGS. 4 and 5.
Figure 8:
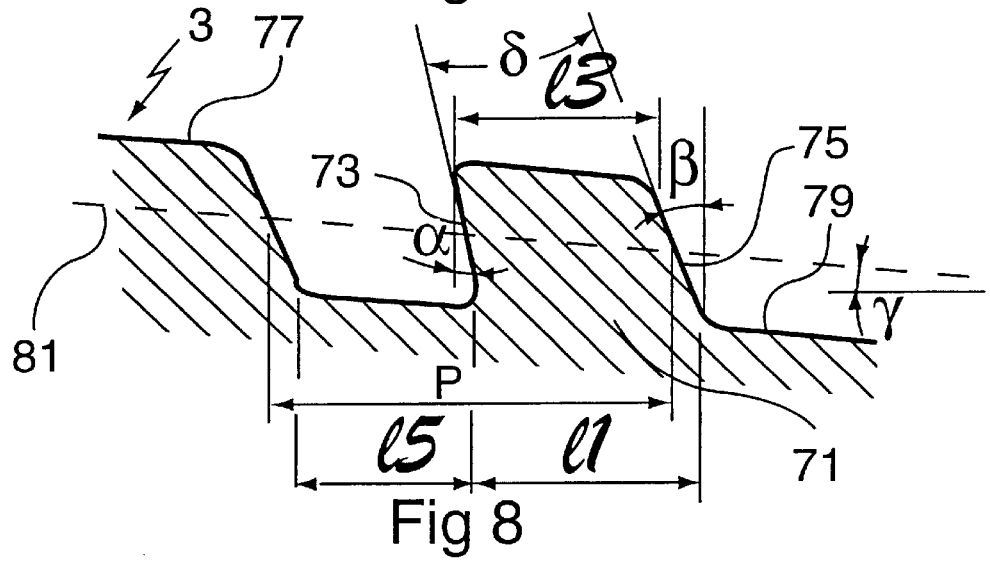
Figure 9:
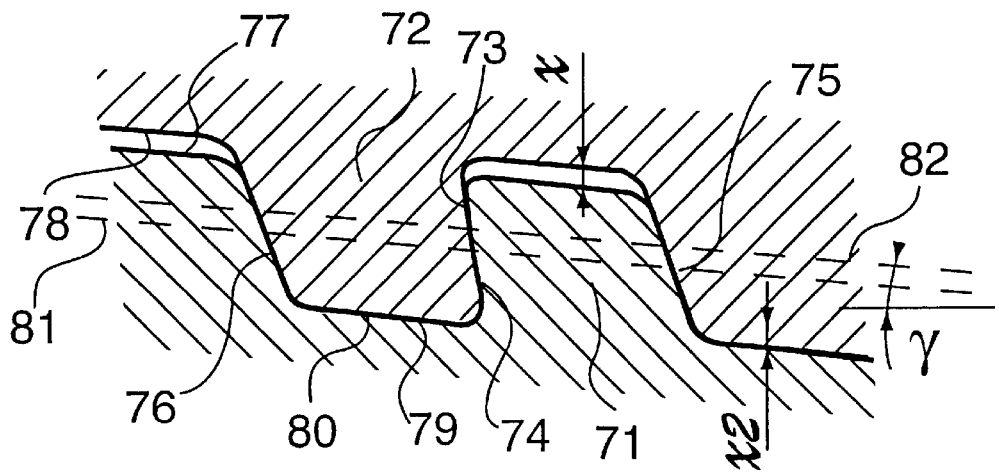
FIG. 9 is a schematic half cross-section of a detail of a few threads of FIGS. 7 and 8 when connected.

Such a variation is shown in FIGS. 7, 8 and 9 respectively for the female thread 4, the male thread 3 and the connection of the two; when makeup is complete (FIG. 9), a clearance x exists between the male thread crests 77 and the female thread roots 78 while the female thread crests 80 radially interfere with the male thread roots 79. Such a disposition has a relatively small influence on the level of the makeup torque.

Preferably for this variation, contact between the female thread crests 80 and the male thread roots 79 occurs before contact between the mating flanks 73, 74, 75, 76.

Figure 10:
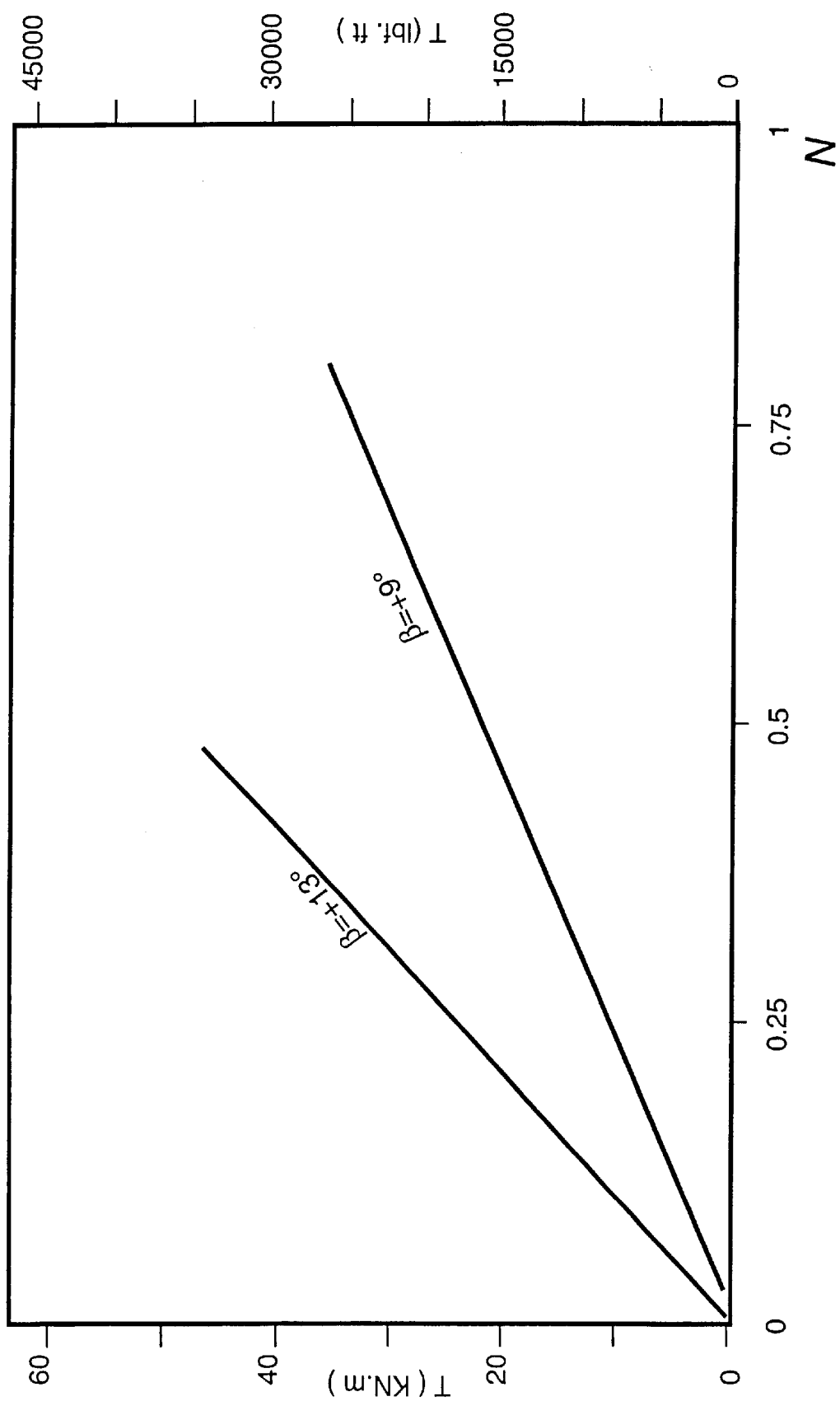
FIG. 10 is a graph of the makeup torque T as a function of the number of turns N in two variations of the connection of FIG. 6.

FIG. 10 shows a graph of the makeup torque T as a function of the number of turns N for the following geometry for pipes of a connection as shown in FIG. 6:
pipe diameter: 177.80 mm
pipe thickness: 10.36 mm (29 lb/ft);
pipe material: low alloy steel with yield stress ≧551 MPa;
5 threads per inch thread;
thread taper TT=6.25% on the diameter ($\gamma$=1.79°);
angle $\alpha$ of load flank=−3°;
angle $\beta$ of stabbing flank: +9° and +13°;
angle $\delta$ between flanks: 6° and 10°.

On this graph, the abscissa N=0 corresponds to the first contact on the two flanks 13–14 and 15–16 of mated threads.

For threads with $\beta$=+90° ($\delta$=6°), a torque of more than 35 kN.m (26000 lbf.ft) was obtained in 0.8 of a revolution, corresponding to a slope of 44.5 kN.m/turn.

For threads with $\beta$=+13° ($\delta$=10°), a torque of 45.9 kN.m (33850 lbf.ft) was obtained in 0.47 of a revolution, corresponding to a slope of 97.5 kN.m/turn.

Such a thread with interference fit thread flanks enables male and female elements to be made up with a very high torque without the need for an abutment but such a torque is then obtained by a rotation of a fraction of a turn of the male and female elements, which may prove to be insufficient particularly when sealing surfaces are to be provided on the male and female elements such as, for example, 5, 6 in FIG. 3.

The development of a given contact pressure between such sealing surfaces necessitates a rotation of one element with respect to the other of the order of one turn after the sealing surfaces come into contact and a precise positioning of the male and female elements when makeup is complete, the positioning being obtained using an abutment constituted by two transverse bearing surfaces such as 7, 8 in FIG. 3.

It is difficult to guarantee satisfactory sealing during service on a threaded connection with interference fit thread flanks of the type of FIGS. 4, 5, 6, the sealing surfaces and the transverse abutment bearing surfaces of the type shown in FIG. 3, taking into account the manufacturing tolerances appropriate for the male and female elements.

A reduction of the angle $\delta$ between the thread flanks would certainly reduce the slope of the curve of the makeup torque as a function of the number of turns but, unless a highly negative angle $\alpha$ of less than −15° is used, which is not desirable, it would be necessary to substantially reduce the angle $\beta$ of the stabbing flanks, which is also not desirable.

Figure 11:
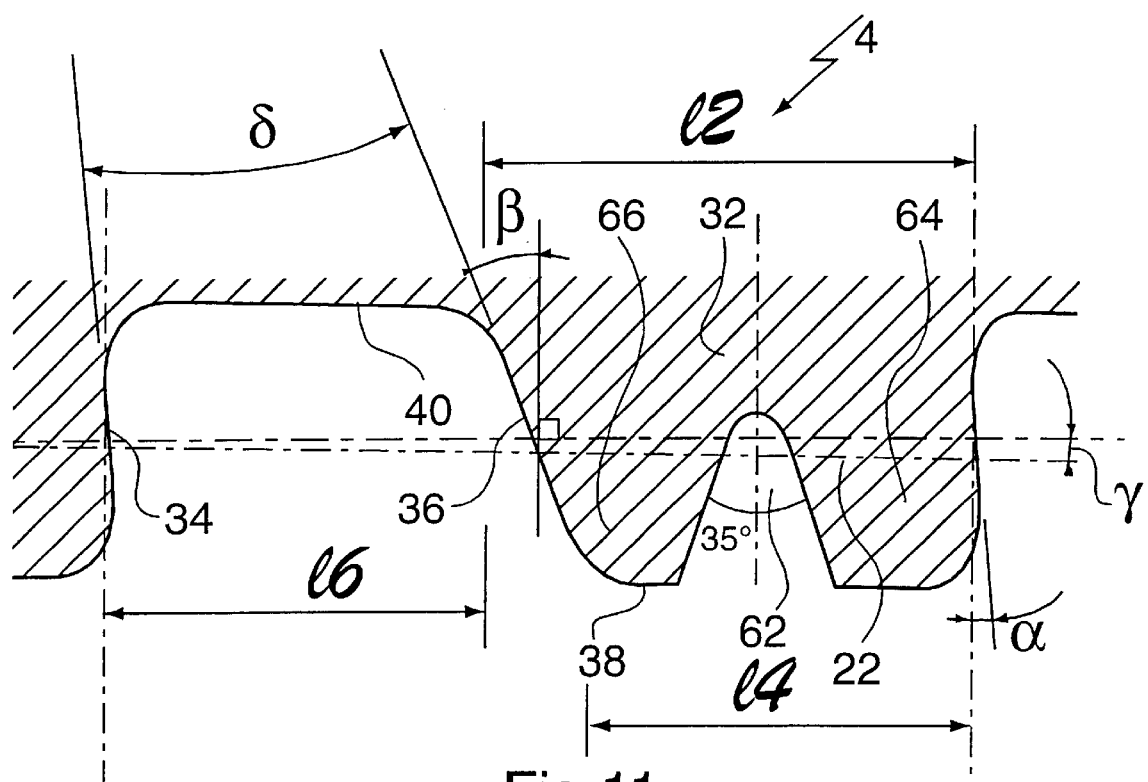
FIG. 11 is a variation of FIG. 4 with a groove in the female threads.
Figure 12:
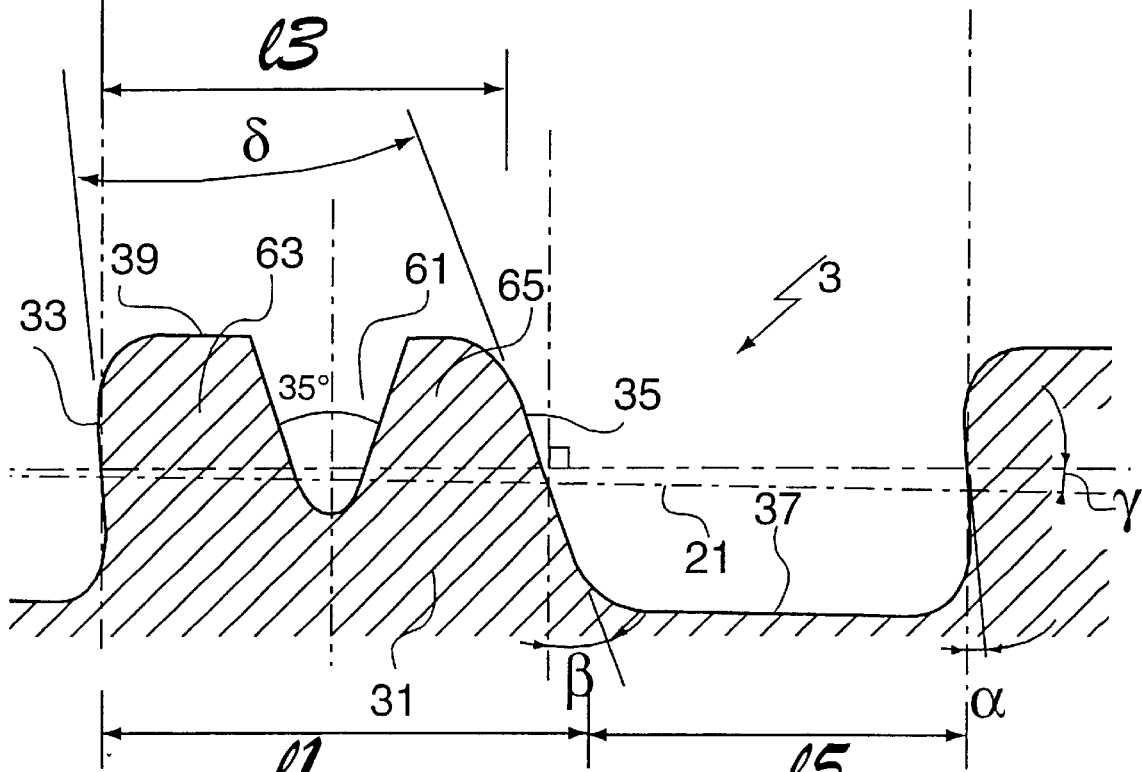
FIG. 12 is a variation of FIG. 5 with a groove in the male threads.

The thread forms illustrated in FIGS. 11 and 12 can resolve the problems of compatibility between the high values of the nominal makeup torque and not too high a value, of the order of 10 kN.m/turn, for example, of the slope dT/dN of the curve of the torque as a function of the number of turns.

The threads of FIGS. 11 and 12 are particularly advantageous in the case of a connection with sealing surfaces and an abutment of the type shown in FIG. 3.

The male threads of FIG. 12 have, as in FIG. 5, a load flank 33 inclined at a negative angle $\alpha$ with respect to the normal to the connection axis, a stabbing flank 35 inclined at a positive angle $\beta$ with respect to this same normal, a thread crest 39 and are separated by a thread root 37.

The features of female threads 32 of FIG. 11 correspond to those of male threads 31 in FIG. 12 with a load flank 34, a stabbing flank 36, a thread crest 38 and a thread root 40 with the same pitch and orientation as those of the male threads 31 with respect to the connection axis.

The width of the male and female thread crests 39, 38 is higher than that of the mating thread roots 40, 37 such that at a given moment during makeup, the male flanks 33, 35 are both in contact with their female mating threads 34, 36 although a radial clearance subsists between the thread crests 39, 38 and the mating thread roots 40, 37. In a variation which is not shown, there could be a positive radial interference between the thread crest of a single thread and the mating thread root.

Male thread 31 has a groove 61 opening into the male thread crest 39, the profile of the groove being a V with a rounded base and in which the axis of the V is substantially normal to the connection axis.

The depth of the groove 61, measured radially, is 65% of the depth of male thread 31 and its base is a circular arc with radius 0.4 mm.

The angle between the two arms of the V of groove 61 is 35° and induces in the male thread 31 of FIG. 12 a groove width, at its opening into the thread crest, of 34% of the width of the male thread measured at mid-depth.

Female thread 32 has a groove 62 opening into the crest of female thread 38, with the same geometry as groove 61 in male thread 31 and disposed in the female thread in the same manner as groove 61.

Such grooves 61, 62 transform each of threads 31, 32 subjected to compression stresses on the two flanks 33, 34, 35, 36 into two cantilevers 63+65, 64+66, subjected to bending stresses.

The resultant flexibility induces a reduction in the interference fit forces when the connection is made up beyond the point of simultaneous contact of the flanks and as a result reduces the slope dT/dN of the curve of the makeup torque as a function of the rotation.

The groove depth and its width at its opening into the thread crest are parameters which can be acted upon to obtain a slope dT/dN of the curve of the makeup torque as a function of the rotation which is not too high, which remains, for example, of the order of 20 kN.m/turn.

The depth of the groove must be less than or equal to the thread depth as otherwise it could unacceptably weaken the structure of the connection.

The groove width at its opening into the thread crest must be less than or equal to $2/3$ of the width of the thread measured at mid height thereof to preserve a sufficient rigidity at the level of the cantilevers 63, 64, 65, 66.

The 0.4 mm radius for the groove base limits stress concentration at the groove base.

Figure 13:
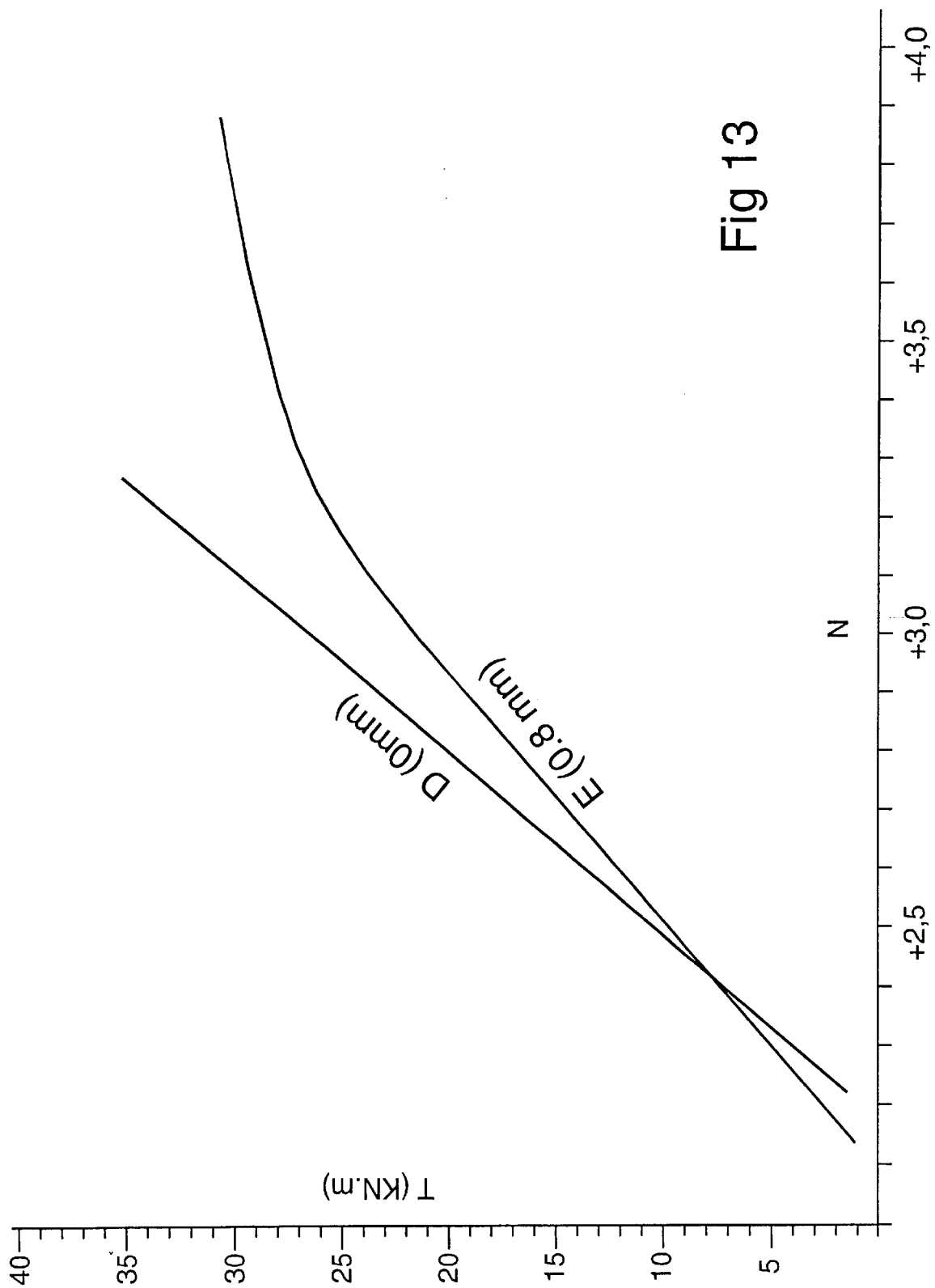
FIG. 13 shows a graph of the makeup torque T as a function of the number of turns N in two variations of the connection of elements of FIGS. 11 and 12.

Curve E in FIG. 13 shows such a thread structure with a groove allowing makeup with a nominal torque of over a minimum desired value for the pipe dimension under consideration (27 kN.m: see Table 1). The slope dT/dN of the graph of the makeup torque changes beyond 25 kN.m: the slope is of the order of 24 kN/turn at the start and it reduces above 25 kN.m to about 9 kN.m.turn, which self-limits the makeup torque and precisely positions the abutments and sealing surfaces. By way of comparison, curve D in FIG. 13 relates to similar threads but without a groove, and has a relatively constant slope of the order of 40 kN/turn.

The connection of the present invention can be produced in a number of variations; the embodiments described here are non limiting.

Figure 14:
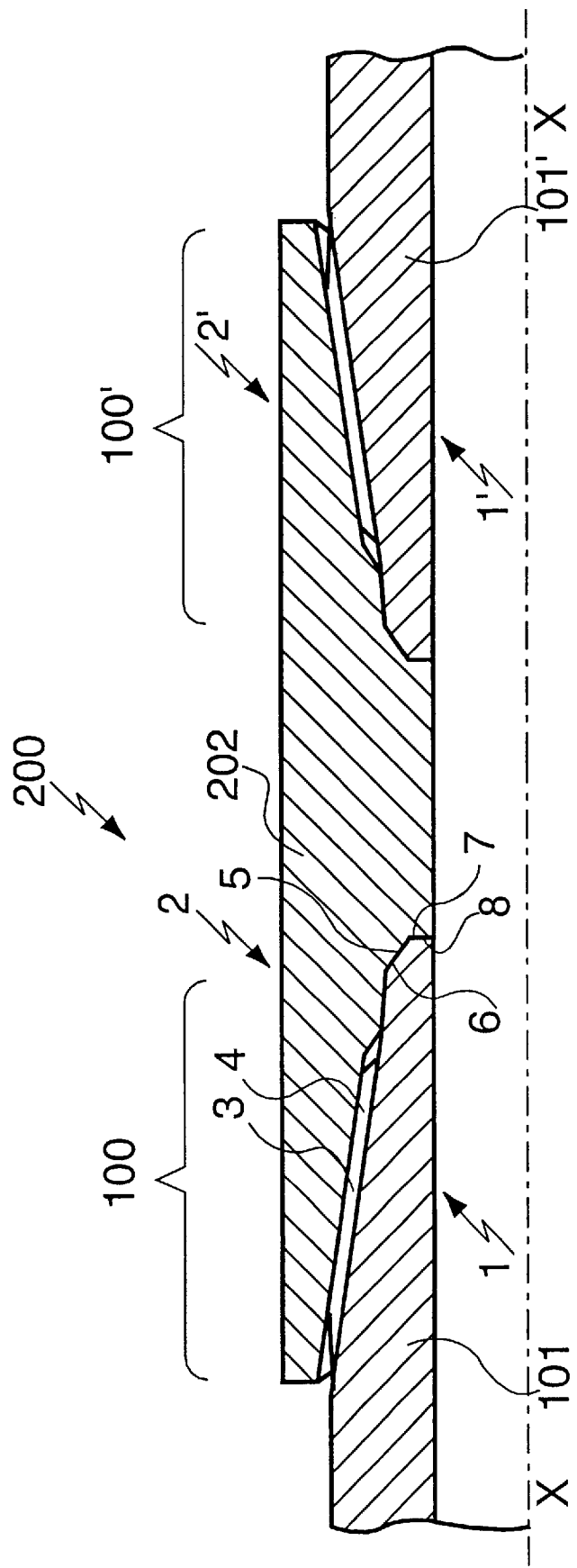
FIG. 14 shows the application of the present invention to a threaded and coupled connection.

In particular, the present invention can be applied both to:

an integral threaded connection 100, a male element 1 being disposed at the end of a first long metal pipe 101 and a female element 2 being disposed at the end of a second long pipe 102;

and to a threaded and coupled connection 200 shown in FIG. 14, in which two long metal pipes 101, 101' comprising a male element 1, 1' at the end are connected via a metal coupling 202 which is provided at each of its ends with a female element 2, 2', such a threaded and coupled connection using two threaded connections 100, 100' of the invention.

What is claimed is:

1. A threaded connection for two metal pipes, comprising a male element at the end of a first metal pipe screwed into a female element at the end of a second metal pipe, the male element comprising an external male tapered thread with trapezoidal threads comprising two flanks, namely a load flank and a stabbing flank, a thread width at a male thread crest being less than the thread width at the root of the male thread, the female element comprising an internal tapered female thread with trapezoidal threads with a form which mates with the male thread, the width of the thread crests on each of the male and female threads being higher than the width of a space between the roots of the mating threads, characterized in that the male element is positioned by screwing into the female element to a relative position of these two elements located beyond the relative position where, during makeup, the two flanks of the male threads come into contact with the two flanks of the female threads so as to induce an axial interference fit of the male threads by the female threads and vice versa.

2. A threaded connection according to claim 1, characterized in that the diametrical interference between the thread crests of each of the two male and female threads and the thread roots of the mating thread is negative or zero when makeup is complete.

3. A threaded connection according to claim 1, characterized in that an axial clearance of at least 0.15 mm subsists between the mated thread crests and roots when the two flanks of the male threads come into contact with their female mates during makeup.

4. A threaded connection according to claim 1, characterized in that the diametrical interference between the thread crests of one of the two male or female threads and the thread roots of the mating thread is positive at the end of connection makeup.

5. A threaded connection according to claim 1, characterized in that the angle (δ) between the load flank and the stabbing flank of the male or female threads is 20° or less.

6. A threaded connection according to claim 5, characterized in that the angle (δ) is in the range 7° to 20°.

7. A threaded connection according to claim 1, characterized in that for each of the male and female threads the thread crests overhang the thread roots on the load flank side, an angle between said load flanks and the normal to the connection axis being in the range 0 to −15°.

8. A threaded connection according to claim 1, characterized in that at least one of the male and female threads comprises a groove opening into the thread crest over all or a portion of the thread length.

9. A threaded connection according to claim 8, characterized in that the depth of the groove is at most equal to the thread depth.

10. A threaded connection according to claim 8, characterized in that the width of the groove at its opening into the thread crest is at most ⅔ of the width of the thread measured at the thread mid-depth.

11. A threaded connection according to claim 8, characterized in that the groove has a profile in the shape of a U or a profile in the shape of a V with a rounded base.

12. A threaded connection according to claim 1, characterized in that each of the male and female elements comprise at least one sealing surface, each male sealing surface having a substantially longitudinal orientation and radially interfering with a mating female sealing surface when makeup is complete.

13. A threaded connection according to claim 1, characterized in that each of the male and female elements comprise at least one bearing surface with a substantially transverse orientation, at least one male bearing surface being abutted with a female bearing surface when makeup is complete.

14. A threaded connection according to claim 1, wherein the first metal pipe and the second metal pipe are elongated in length.

15. Use of two threaded connections according to claim 1 to connect two long metal pipes which comprise a male element at their end via a metal coupling which is provided with a female element at each of its ends.

* * * * *